(12) United States Patent
Saito et al.

(10) Patent No.: US 8,243,110 B2
(45) Date of Patent: Aug. 14, 2012

(54) OPTICAL WRITING DEVICE AND OPTICAL WRITING METHOD

(75) Inventors: Yasunori Saito, Kanagawa (JP);
Tsutomu Ishii, Kanagawa (JP);
Shigehiko Sasaki, Kanagawa (JP);
Masahiro Sato, Kanagawa (JP); Akira Ichiboshi, Kanagawa (JP); Kyotaro Tomoda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 806 days.

(21) Appl. No.: 12/270,479

(22) Filed: Nov. 13, 2008

(65) Prior Publication Data
US 2009/0245067 A1    Oct. 1, 2009

(30) Foreign Application Priority Data
Mar. 25, 2008 (JP) .................................. 2008-078376

(51) Int. Cl.
*G03G 13/04* (2006.01)
(52) U.S. Cl. .......................... 347/118; 347/238; 369/126
(58) Field of Classification Search ............... 369/30.06, 369/30.2, 30.28, 30.33, 30.34, 34.01, 126; 347/111, 117, 118, 119, 238
See application file for complete search history.

(56) References Cited

U.S. PATENT DOCUMENTS

| | | | | |
|---|---|---|---|---|
| 4,888,616 A | * | 12/1989 | Nanamura et al. ................. 399/6 |
| 5,155,501 A | * | 10/1992 | Fujita et al. .................... 347/158 |
| 5,943,067 A | * | 8/1999 | Kong ................................. 347/2 |
| 6,392,725 B1 | * | 5/2002 | Harada et al. .................... 349/74 |
| 6,670,981 B1 | * | 12/2003 | Vincent et al. ................ 347/264 |
| 7,777,771 B2 | * | 8/2010 | Sakurai et al. ................ 347/218 |
| 2003/0103762 A1 | * | 6/2003 | Araki et al. ..................... 386/46 |
| 2004/0056942 A1 | * | 3/2004 | Kobayashi .................... 347/111 |
| 2004/0114913 A1 | * | 6/2004 | Kume ........................... 386/125 |
| 2005/0025525 A1 | * | 2/2005 | Horike et al. ................. 399/252 |
| 2008/0018690 A1 | * | 1/2008 | Nishida .......................... 347/18 |

FOREIGN PATENT DOCUMENTS
JP    A-2003-5148    1/2003

* cited by examiner

*Primary Examiner* — Thomas Alunkal
(74) *Attorney, Agent, or Firm* — Oliff & Berridge, PLC

(57) ABSTRACT

An optical writing device performs writing on an exposure region of a light writing display medium. The optical writing device includes an accommodation section, a light irradiation member, a voltage application member, a medium conveyance member and control means. The control means performs control for: applying voltage with the voltage application member to a first medium; the light irradiation member irradiating the light bearing image information and moving a first distance in the first direction over the first medium; the voltage application member applying voltage to a second medium; the light irradiation member irradiating the light for image erasure onto the second medium and moving a second distance in the second direction over the second medium; and, simultaneously the movement of the light irradiation member in the second direction, the medium conveyance member conveying the first medium.

13 Claims, 12 Drawing Sheets

OPTICAL WRITING DEVICE AND OPTICAL WRITING METHOD

CROSS-REFERENCE TO RELATED APPLICATION

This application is based on and claims priority under 35 USC 119 from Japanese Patent Application No. 2008-078376 filed Mar. 25, 2008.

BACKGROUND

1. Technical Field

The present invention relates to an optical writing device and an optical writing method.

2. Related Art

An image recording medium is known at which, when a visible image is to be recorded, a writing electric field is applied while exposure light is being irradiated at the image recording medium, and when a reset is being performed to record a uniform initial image, a resetting electric field is applied for a predetermined duration, or the resetting electric field is applied for a predetermined duration and exposure light is irradiated.

SUMMARY

The present invention will provide an optical writing device that, when image recording is performed, shortens a duration required for the image recording.

An aspect of the present invention is an optical writing device that performs optical writing on an exposure region of a light writing display medium in which a light-conductive layer is laminated at a display layer, the optical writing device comprising: an accommodation section at which a plurality of the media are stacked; a light irradiation member that performs light irradiation at a medium, of the plurality of media, of which the exposure region is exposed, the light irradiation member moving in a first direction while irradiating light bearing image information, and irradiating light for image erasure while moving in a second direction, which is opposite to the first direction; a voltage application member that connects with, of the plurality of media, the medium that is irradiated with light by the light irradiation member, and applies a voltage required for times of optical writing to the medium that is irradiated with light by the light irradiation member; a medium conveyance member that, simultaneously with the movement of the light irradiation member in the second direction, conveys, of the plurality of media, the medium for which the irradiation with light bearing image information has been performed, in the second direction; and a control section that performs control for applying voltage with the voltage application member to a first medium, which is stacked at an outermost side of the plurality of media, the light irradiation member irradiating the light bearing image information and moving a first distance in the first direction over the first medium, the voltage application member applying voltage to a second medium, which is stacked at an inner side relative to the first medium, the second medium being exposed by the first medium being conveyed, the light irradiation member irradiating the light for image erasure at the second medium and moving a second distance in the second direction over the second medium, and, simultaneously with the movement of the light irradiation member in the second direction, the medium conveyance member conveying the first medium.

BRIEF DESCRIPTION OF THE DRAWINGS

Exemplary embodiments of the present invention will be described in detail based on the following figures, wherein.

DETAILED DESCRIPTION

An optical writing device of a first exemplary embodiment relating to the present invention will be described in accordance with FIG. 1A and FIG. 1B to FIG. 6.

—Overall Structure—

A light writing image display medium P relating to the present exemplary embodiment will be described.

Figure 4:
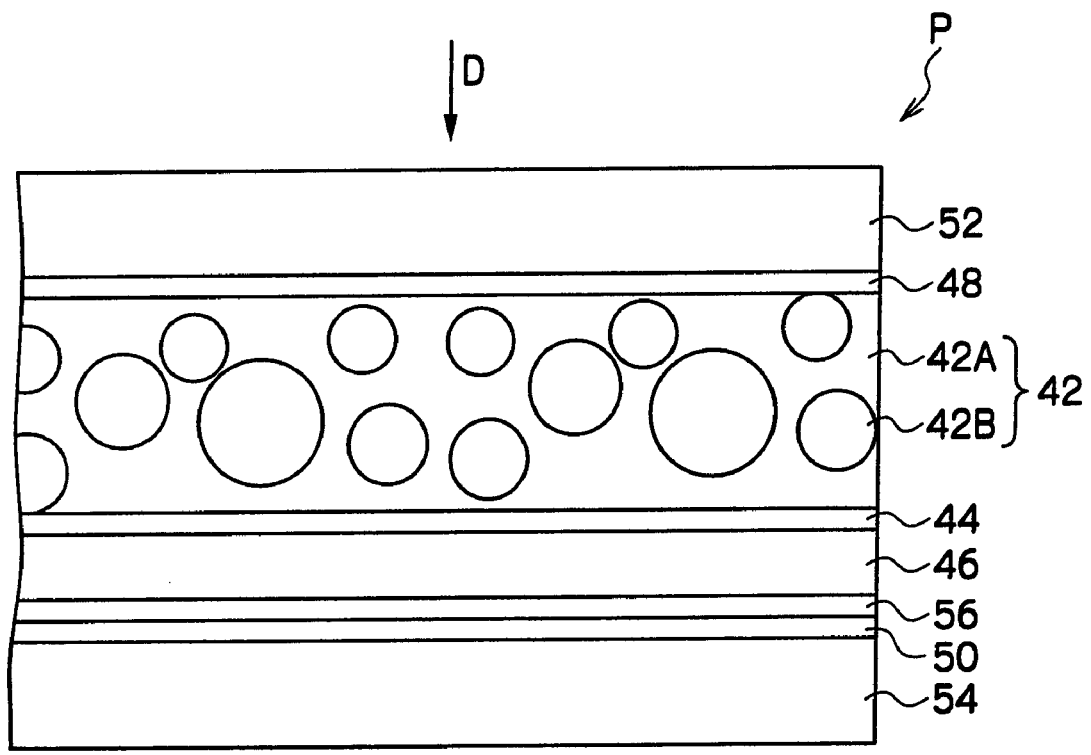
FIG. 4 is a sectional view of an image display medium that is used at the optical writing device relating to the first exemplary embodiment of the present invention.

FIG. 4 is a sectional view of an image display medium that is used at the optical writing device relating to the first exemplary embodiment of the present invention. As shown in FIG. 4, the image display medium P includes a liquid crystal layer 42 and an optical conductor layer 46, which touches against the liquid crystal layer 42 with a laminate layer 44 sandwiched therebetween. The image display medium P is a structure that is sandwiched by a plate-form electrode layer 48 and electrode layer 50. The electrode layer 48 is disposed at the liquid crystal layer 42 side and the electrode layer 50 is disposed at the optical conductor layer 46 side. A terminal 60 is provided at the electrode layer 48 and a terminal 62 is provided at the electrode layer 50, so as to connect when voltage is being applied from a voltage application member, which will be described later. More details will be described below.

The liquid crystal layer 42 is constituted by numerous microcapsules 42B, which contain cholesteric liquid crystals, and a binder 42A, which retains the microcapsules 42B in the liquid crystal layer 42. Because the liquid crystals are retained in the form of being contained in the microcapsules 42B in this manner, molecular orientations of the liquid crystals will not be disrupted easily even if the image display medium P is bent, and an image that is formed has a structure that is resistant to warping. The binder 42A is, for example, a polymer layer.

The optical conductor layer 46 is a layer of a conductor with the characteristic that a resistance value thereof varies when light is irradiated thereon; for example, an organic optical conductor whose resistance value falls in accordance with irradiation of light. Of the electrode layer 48 and the electrode layer 50, at least the electrode layer 48 disposed at the liquid crystal layer 42 side has (a) transparent electrode(s).

A support 52 and a support 54 are disposed at outer sides of the electrode layer 48 and the electrode layer 50, respectively, and preserve the shape of the image display medium P. Of the support 52 and the support 54, at least the support 52 disposed at the liquid crystal layer 42 side is transparent. The support 52 and the support 54 are, for example, polyethylene terephthalate (PET) substrates. Furthermore, a black layer 56, which does not transmit light, is provided between the optical conductor layer 46 and the electrode layer 50.

Because light that is transmitted through the liquid crystal layer 42 is absorbed in the black layer 56, a region of the image display medium P at which the liquid crystal layer 42 transmits light appears black to a user. In contrast, a region at which the liquid crystal layer 42 reflects light appears to the user as a color of reflected light from the liquid crystals (hereinafter referred to as white light). In a case in which the electrode layer 50 has a transparent electrode, the black layer 56 may be disposed between the electrode layer 50 and the support 54. Further yet, in a case in which the support 54 is transparent, the black layer 56 may be disposed at the outer side of the support 54.

Thus, irradiation of light onto the liquid crystal layer 42 in the direction of arrow D of FIG. 4 is possible, and a user may visually see the forms of images from the direction of arrow D, and erasure.

Optical writing is carried out with a medium which is used for the display layer side writing, in which light is irradiated through the support 52 onto a writing region (an exposure region). The support 54 is constituted with a light-transmissive material, and the black layer 56 is provided between the liquid crystal layer 42 and the optical conductor layer 46. In a case in which the optical writing medium is structured with a back face side, opposite from the display face side, being the exposure region, the medium may be used as a display layer back side writing medium.

Hereafter, an example using a medium of the display layer side writing type will be described.

Overall structure of the optical writing device relating to the present exemplary embodiment will be described.

Figure 3:
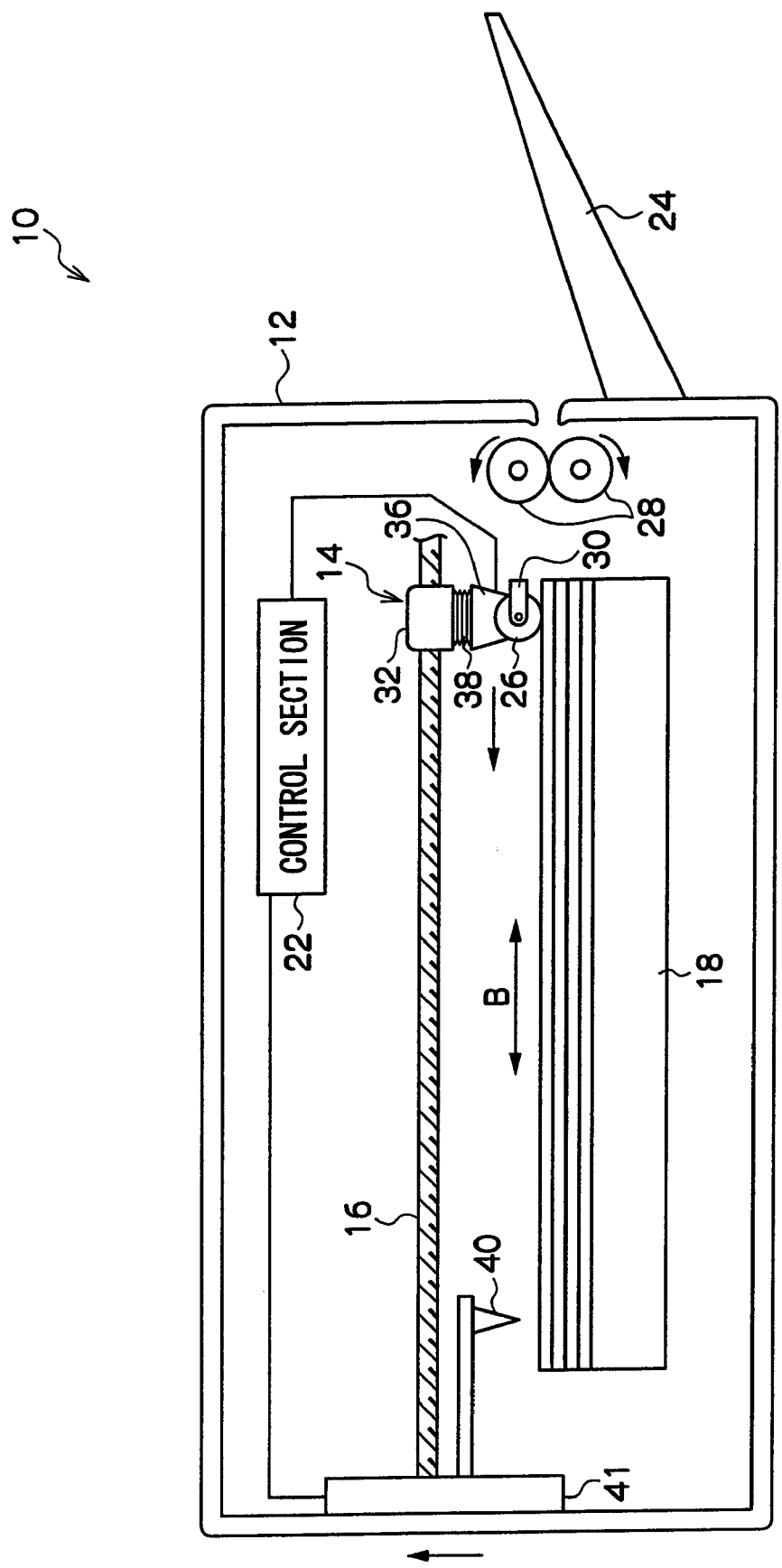
FIG. 3 is a schematic structural diagram of the optical writing device relating to the first exemplary embodiment of the present invention.
Figure 6:
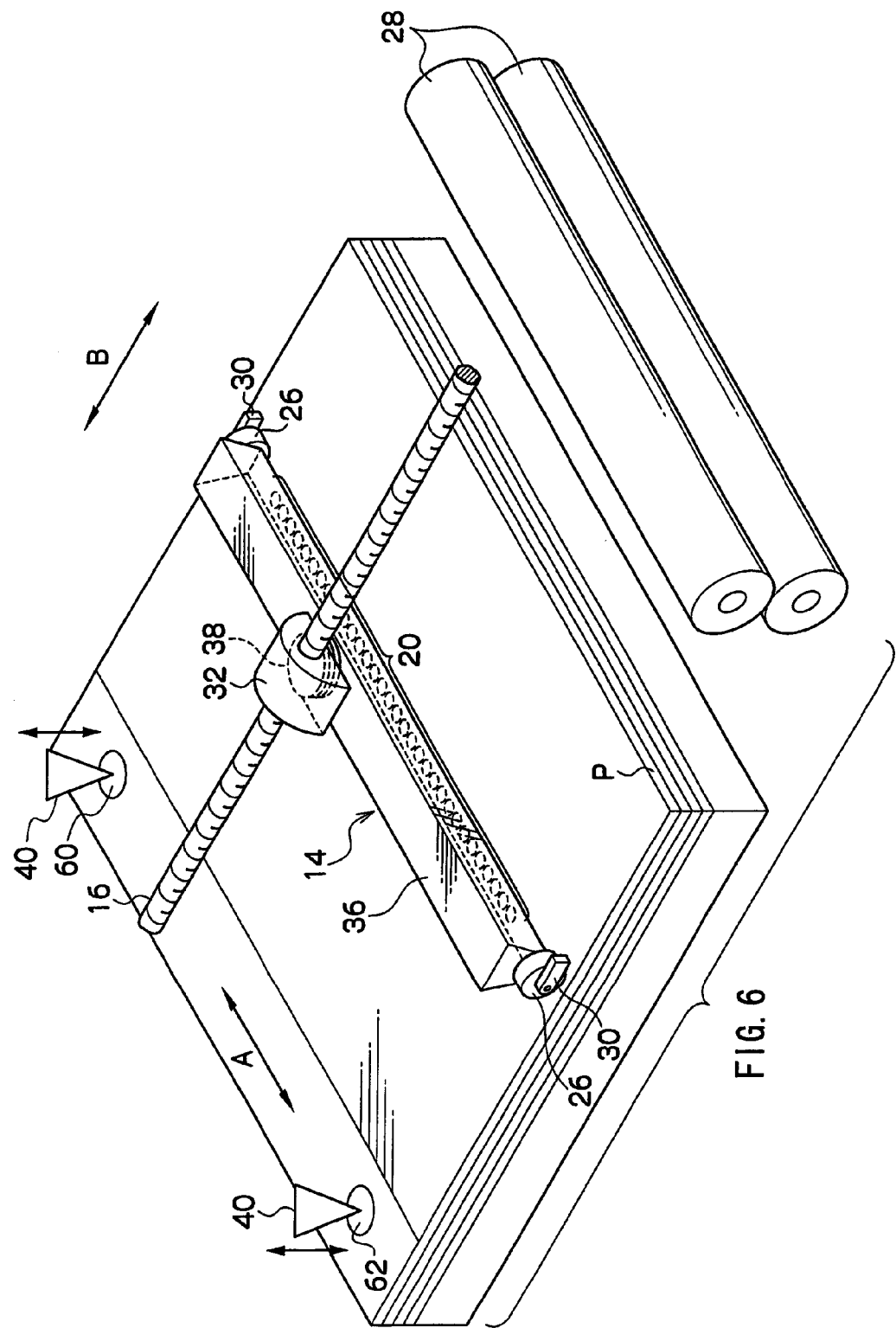
FIG. 6 is a perspective view of the optical writing device relating to the first exemplary embodiment of the present invention.

FIG. 3 is a schematic structural diagram of the optical writing device relating to the first exemplary embodiment of the present invention, and FIG. 6 is a perspective view of the optical writing device relating to the first exemplary embodiment of the present invention. As shown in FIG. 3 and FIG. 6, an optical writing device 10 is structured to include a box-like casing 12, an LED printing head (hereinafter referred to as an LPH) 14 which serves as an exposure device accommodated in the casing 12, and a cylindrical shaft 16, which guides movement of the LPH 14.

A plurality of sheets of the image display medium P are stacked below the LPH 14. A plate-form accommodation section 18 is provided, on which the image display media P are stacked. This accommodation section has a structure which is continuously pushed upward by, for example, a spring, so as to lift up the image display media P. An ejection tray 24, to which an image display medium P on which an image has been formed is ejected, is provided at a side face of the casing 12. Ejection rollers 28, which eject the image display medium P to the ejection tray 24, are provided in the casing 12 in correspondence with the ejection tray 24. In the structure in FIG. 3, the LPH 14 is disposed above the image display media P. However, in a case in which the image display media P are stacked with the exposure faces oriented downward, a structure is formed in which the LPH 14 is disposed below the image display media P.

In such a case, at a time of image formation on a below-described image display medium P, and at a time of image erasure, an image display medium P that is irradiated with light bearing image information from the LPH 14 will be an image display medium P at a lowermost position, rather than an image display medium P at an uppermost position. Further, an image display medium P that is to be irradiated with light for image erasure will be an image display medium P that is disposed above the image display medium P at the lowermost position, which is exposed by the image display medium P in the lowermost position being conveyed by a medium conveyance member.

The LPH 14 is formed in a long strip shape. In the state in which the image display media P are stacked on the accommodation section 18, the LPH 14 opposes the accommodation section 18, with the image display media P sandwiched therebetween, and is disposed at a position in the vicinity of an end portion of the image display medium P (a first position). A passage member 32, through which the shaft 16 passes, is provided at a longitudinal direction middle portion of the LPH 14. A spring 38, which pushes the LPH 14 toward the image display media P, is provided between a main body 36 of the LPH 14 and the passage member 32.

A helical male thread form is provided at an outer peripheral face of the shaft 16, and a female thread form, which meshes with that thread form, is provided in the passage member 32. Thus, this is a structure in which the LPH 14 moves forward and backward when the shaft 16 is rotated circumferentially.

The LPH 14 also includes a lower face 34 that opposes the image display media P stacked on the accommodation section 18 and that acts as an emission portion, which emits light bearing image information. An LED array 20 is provided at the lower face 34. The LED array 20 includes plural LEDs (light emitting diodes) which serve as light emission elements arranged in a line along a length direction of the LPH 14, and lenses through which light irradiated from the LEDs is transmitted towards the image display medium P while being focused. Herein, instead of the LED array 20, the LPH 14 may include semiconductor lasers arranged in a line or the like.

In the following descriptions, the length direction of the LPH 14, which is the direction of the double-headed arrow A in FIG. 6, is referred to as a "main direction", and a direction intersecting the main direction, which is the direction of the double-headed arrow B in FIG. 6, is referred to as a "sub direction".

The lower face 34 of the LPH 14 is formed of a material which does not transmit light. Thus, the image display media P stacked on the accommodation section 18 are shielded from external light at a region that is covered from above by the lower face 34 of the LPH 14.

Roller members 26 are provided at each of two length direction end portions of the LPH 14. The LPH 14 guided by the shaft 16 passes along the image display medium P along the sub direction (the direction of arrow B) from a first position (see FIG. 3), and moves to a second position (see FIG. 1B). During this movement, the roller members 26 roll on the image display medium P and maintain a separation between the LPH 14 and the image display medium P. Hereinafter, a direction from the first position toward the second position is referred to as a first direction, and a direction from the second position toward the first position is referred to as a second direction.

A protruding member 30 is provided at the outer side of each roller member 26. The protruding member 30 is a contact member with a cross-section that is rectangular, and extends substantially parallel with the surface of the image display medium P. The protruding member 30 serves as a medium conveyance member. When the LPH 14 is guided by the shaft 16 and moves along the sub direction (the direction of arrow B) from the second position (see FIG. 1B) to the first position (see FIG. 3), the protruding members 30 feed the image display medium P out to a conveyance path. Because the medium conveyance member is formed as the protruding members 30 attached at the roller members 26, it is possible to utilize driving force of the LPH for conveying the image display medium P.

As shown in FIG. 3 and FIG. 6, in the optical writing device, voltage application members 40, which implement applications of voltage to the electrode layer 48 and the electrode layer 50, are provided in vicinities of edge portions extending in the sub direction (the direction of arrow B) of the image display medium P. The voltage application members 40 connect with the terminal 60 of the electrode layer 48 and the terminal 62 of the electrode layer 50 of the image display medium P. A voltage application member-raising/lowering mechanism 41, which drives the voltage application member up and down, is provided in connection with the voltage application members 40. At a time of application of voltage to a medium, voltage is applied to the voltage application members by an unillustrated power supply. In FIG. 3, because the optical writing device is represented in an initial state prior to image writing, the voltage application members 40 are not connected with the terminal 60 of the electrode layer 48 and the terminal 62 of the electrode layer 50 of the image display medium P. In FIG. 6, because the optical writing device is shown during an image writing operation, the voltage application members 40 are connected with the terminal 60 of the electrode layer 48 and the terminal 62 of the electrode layer 50 of the image display medium P. Operations of the voltage application members 40 and the voltage application member-raising/lowering mechanism 41 will be described in more detail later.

As shown in FIG. 6, the terminal 60 of the electrode layer 48 and also the terminal 62 of the electrode layer 50 are disposed in the vicinities of the edge portions extending along the sub direction (the direction of arrow B) of the image display medium P. The electrode layer 48 and the electrode layer 50 are uniform electrodes.

When light is to be irradiated at the image display medium P while the LPH 14 is being guided by the shaft 16 and moving in the sub direction, the electrode layer 48 and electrode layer 50 conduct electricity from the voltage application members 40 through the terminal 60 and terminal 62. Because the terminal 60 and terminal 62 are disposed in the vicinities of the edge portions extending in the sub direction, connection between the terminal 60 and terminal 62 and the voltage application members 40 is easy, even during conveyance of the LPH. Connection and disconnection between the voltage application members 40 and the terminal 60 and terminal 62 will be described in more detail later.

As shown in FIG. 3, a driving member (not shown), a light irradiation member conveyance section (not shown), the power supply (not shown) and a control section 22 are also provided inside the casing 12 of the optical writing device 10. The driving member selectively applies voltage to respective terminals of the LEDs 20A included in the LED array 20 of the LPH 14 (see FIG. 6) and causes light emission to be implemented. The light irradiation member conveyance section causes the shaft 16 of the LPH 14 to rotate and convey the LPH 14 in the sub direction (the direction of arrow B). The power supply applies voltage to the voltage application members. The control section 22 controls the voltage application member-raising/lowering mechanism, the driving member and the light irradiation member conveyance section.

Here, the electrode layer 48 is connected to ground and DC voltage is applied to the electrode layer 50 by the voltage application members 40.

The size of the DC voltage that is applied between the electrode layer 48 and the electrode layer 50 by the voltage application members 40 is that of an image forming voltage (described later) while the LPH 14 is moving from the first position (see FIG. 3) to the second position (see FIG. 1B), and is that of a resetting voltage (described later) while the LPH 14 is moving from the second position (see FIG. 1B) to the first position (see FIG. 3). The image forming voltage and the resetting voltage are suitably adjusted in accordance with characteristics of the image display medium.

The control section 22 receives image data from an external data processing device such as a PC (personal computer), a portable telephone or the like, and controls the driving section in accordance with the received image data. Accordingly, the control section 22 causes selective irradiation of light from the plural LEDs 20A of the LED array 20 to be implemented. At the same time, the control section 22 controls the light irradiation member conveyance section, and thus moves the LPH 14 from the first position (see FIG. 3) to the second position (see FIG. 1B) at a constant speed.

The control section 22 also controls the driving section when the LPH 14 that has moved to the second position is moving to the first position. Accordingly, the control section 22 causes irradiation of uniform light for erasing an image from the plural LEDs 20A of the LED array 20 to be implemented. At the same time, the control section 22 controls the light irradiation member conveyance section, and thus causes the LPH 14 that has moved to the second position to move toward the first position at a constant speed. The operation of moving the LPH 14 from the second position to the first position will be described later.

—Operation within the Image Display Medium—

Next, a mechanism by which an image is formed at an image display medium P by the optical writing device 10 provided with the above structure will be described.

Figure 5A:
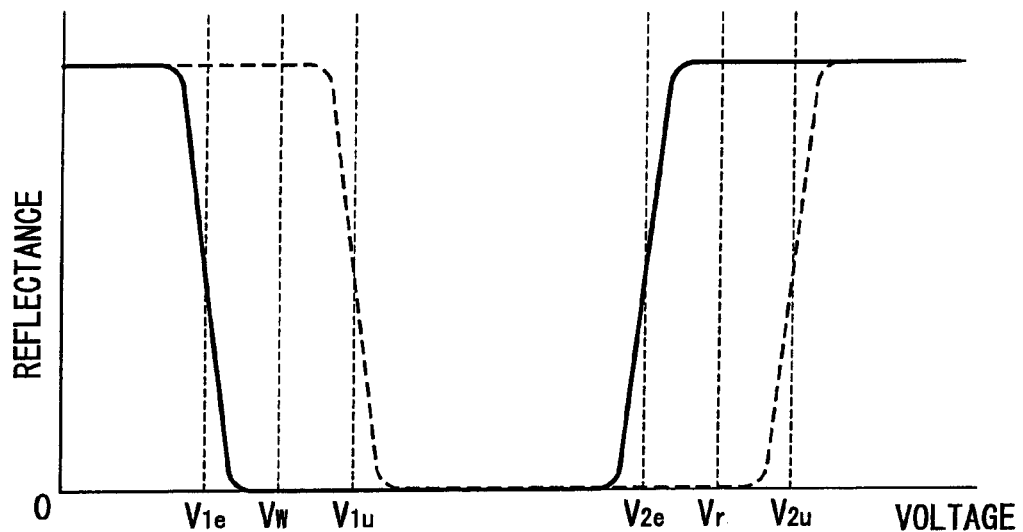
FIG. 5A is a graph showing a characteristic of the image display medium that is used at the optical writing device relating to the first exemplary embodiment of the present invention.
Figure 5B:
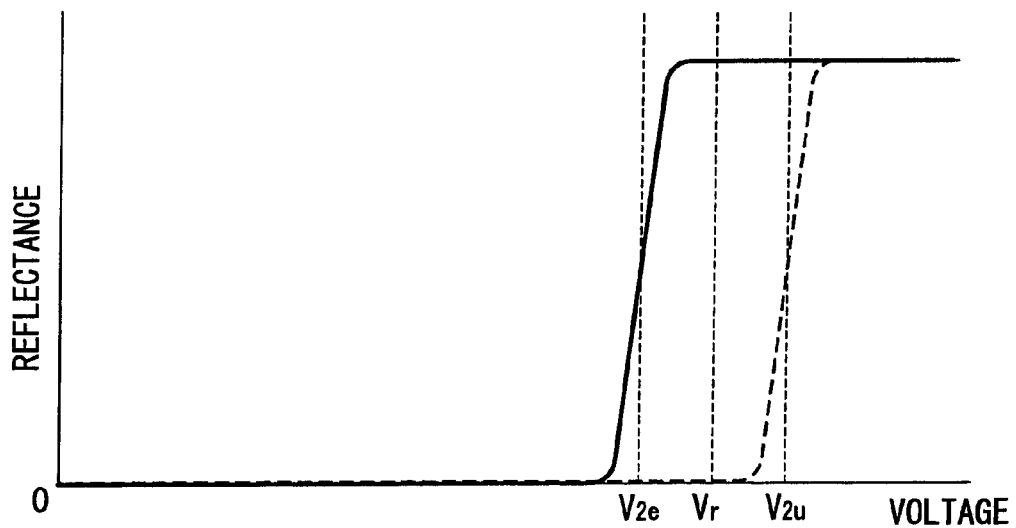
FIG. 5B is a graph showing a characteristic of the image display medium that is used at the optical writing device relating to the first exemplary embodiment of the present invention.

FIG. 5A and FIG. 5B show characteristics of an image display medium that is employed with the optical writing device relating to the first exemplary embodiment of the present invention. FIG. 5A and FIG. 5B show, in graphs, relationships between voltages applied between the electrode layer 48 and the electrode layer 50 and reflectances against light incident in the electric field direction at the cholesteric liquid crystals contained in the microcapsules 42B that are sandwiched between the electrode layer 48 and the electrode layer 50.

Cholesteric liquid crystals have three orientations, depending on an applied voltage: the planar orientation (hereinafter referred to the as the "P orientation"), which is an orientation state in which the axis of a helix traced by the director of a liquid crystal is substantially parallel with an electric field direction and reflectance of incident light is high; the focal conic orientation (hereinafter referred to as the "F orientation"), which is an orientation state in which the axis of the helix is substantially orthogonal to the electric field direction and the reflectance of incident light is low; and the homeotropic orientation (hereinafter referred to as the "H orientation"), which is an orientation state in which the director is aligned with the electric field direction. Of these orientations, the P orientation and the F orientation are stable when the voltage is removed; that is, they have memory characteristics. However, the H orientation is unstable, and switches into the P orientation if the voltage drops suddenly or into the F orientation if the voltage drops gradually, and become then stable.

FIG. 5A shows—for a case in which the cholesteric liquid crystals in the microcapsules 42B are in the P orientation in a state in which voltage is not applied between the electrode layer 48 and the electrode layer 50, a voltage is applied between the electrode layer 48 and the electrode layer 50 and then this voltage drops suddenly—a relationship between the applied voltage and a reflectance of the cholesteric liquid crystals after the voltage has dropped. In FIG. 5A, the broken-line graph shows the relationship between the voltage and reflectance for a case in which there is no irradiation of light onto the optical conductor layer 46, and the solid-line graph shows the relationship between the voltage and reflectance for a case in which light of a predetermined intensity is irradiated onto the optical conductor layer 46.

If there is no irradiation of light, then as the voltage increases, the cholesteric liquid crystals in the P orientation switch into the F orientation, with a voltage in the vicinity of $V_{1u}$ being a threshold voltage. Hence, the cholesteric liquid crystals in the F orientation switch into the H orientation, with a voltage in the vicinity of $V_{2u}$ being a threshold voltage.

On the other hand, if light is irradiated, the change in orientation state of the cholesteric liquid crystals as the voltage increases is the same as in the case in which there is no irradiation of light, but the threshold voltage for switching from the P orientation to the F orientation and the threshold voltage for switching from the F orientation to the H orientation are lower than in the case in which there is no irradiation of light. That is, these threshold voltages are a voltage $V_{1e}(V_{1e}<V_{1u})$ and a voltage $V_{2e}(V_{2e}<V_{2u})$, respectively. This is because, although the voltage between the electrode layer 48 and the electrode layer 50 is fixed, a resistance value of the optical conductor layer 46 is reduced by the irradiation of light, as a result of which a voltage that affects the cholesteric liquid crystals included in the liquid crystal layer 42 rises.

FIG. 5B shows—for a case in which the cholesteric liquid crystals in the microcapsules 42B are in the F orientation in a state in which voltage is not applied between the electrode layer 48 and the electrode layer 50, a voltage is applied between the electrode layer 48 and the electrode layer 50 and then this voltage suddenly drops—a relationship between the applied voltage and the reflectance of the cholesteric liquid crystals after the voltage has dropped. In FIG. 5B, the broken-line graph shows the relationship between the voltage and reflectance for a case in which there is no irradiation of light onto the optical conductor layer 46, and the solid-line graph shows the relationship between voltage and reflectance for a case in which light of a predetermined intensity is irradiated onto the optical conductor layer 46.

As shown in FIG. 5B, the cholesteric liquid crystals which are in the F orientation in the state in which the voltage is zero keep the F orientation until the voltage reaches the vicinity of a voltage $V_{2u}$ (in the case in which there is no irradiation of light) or a voltage $V_{2e}$ (in the case in which there is irradiation of light), which are threshold voltages for switching from the F orientation to the H orientation, and hence switches to the H orientation. This is similar to the case in which voltage is raised from the P orientation state, in that the threshold voltage when light is irradiated is lower than the threshold voltage when there is no irradiation of light.

If a voltage $V_r(V_{2e}<V_r)$ is applied to the image display medium P and, in this state, light is uniformly irradiated and then the voltage drops in a short duration, the cholesteric liquid crystals in the image display medium P all switch into the P orientation, and become stable. Hence, the whole surface of the image display medium P appears white to a user. Hereinafter, the state in which the orientations of the liquid crystals are aligned in this manner will be referred to as a "reset state" of the image display medium P. The reset state is not limited to the P orientation and may have the whole surface in the F orientation. In such a case, the whole surface appears black. Alternatively, a voltage between $V_{2e}$ and $V_{2u}$ may be applied, and the P orientation and F orientation mixed in uniform proportions over the whole surface. In such a case, the whole surface will appear gray. The voltage $V_r$ is the reset voltage referred to earlier. Here, the image display medium P may be set to the reset state by performing voltage application while performing light irradiation, or the image display medium P may be is set to the reset state by performing voltage application alone. However, in a case of voltage application alone, the reset voltage $V_r$ will need to be higher than in a case with light irradiation being performed.

Then, in a case where a voltage $V_w(V_{1e}<V_w<V_{1u})$ is applied to the image display medium P in the reset state and, in this state, light is irradiated and then the voltage is removed, the cholesteric liquid crystals in the image display medium P switch to the F orientation and become stable. On the other hand, in a case where the voltage $V_w$ is applied to the image display medium P and, in this state, the voltage is removed without a light irradiation, the cholesteric liquid crystals in the image display medium P stay unaltered in the P orientation. Hence, a region that was irradiated with light while the voltage was applied appears black to a user, and a region that was not irradiated with light appears white. As a result, a black and white image is formed on the image display medium P. The voltage $V_w$ is the image forming voltage referred to earlier.

Now, the reset voltage and the image forming voltage are not limited to the voltages mentioned above. For example, if light is uniformly irradiated in a state in which a reset voltage that is above $V_{2u}$ is applied, and then the voltage is dropped in a short duration, the cholesteric liquid crystals in the image display medium P will all switch to the P orientation and become stable. Thus, the whole surface is whitened. Then, selective light is irradiated at the image display medium P while an image forming voltage $V_r$, which is $V_{2e}<V_r<V_{2u}$, is applied. The cholesteric liquid crystals in a region irradiated with the light switch to the H orientation, and thereafter switch to the P orientation and become stable, appearing white. On the other hand, the cholesteric liquid crystals in a region not irradiated with the light are in the F orientation and appear black. An image may be formed at the image display medium P in this manner.

—Image Formation and Image Erasure Operations—

Next, an operation for forming an image on an image display medium P using the optical writing device 10 of this first exemplary embodiment and an operation for erasing an image at the image display medium P will be described.

FIG. 1A, FIG. 1B, FIG. 2A and FIG. 2B are operation description diagrams of the optical writing device relating to the first exemplary embodiment of the present invention. Firstly, as shown in FIG. 3, the LPH 14 is disposed at the first position, which is the initial position, and the protruding members 30 are arranged substantially parallel with the image display media P and separated from the image display medium P that is in a topmost position. The voltage application members 40 are also separated from the topmost image display medium.

Figure 1A:
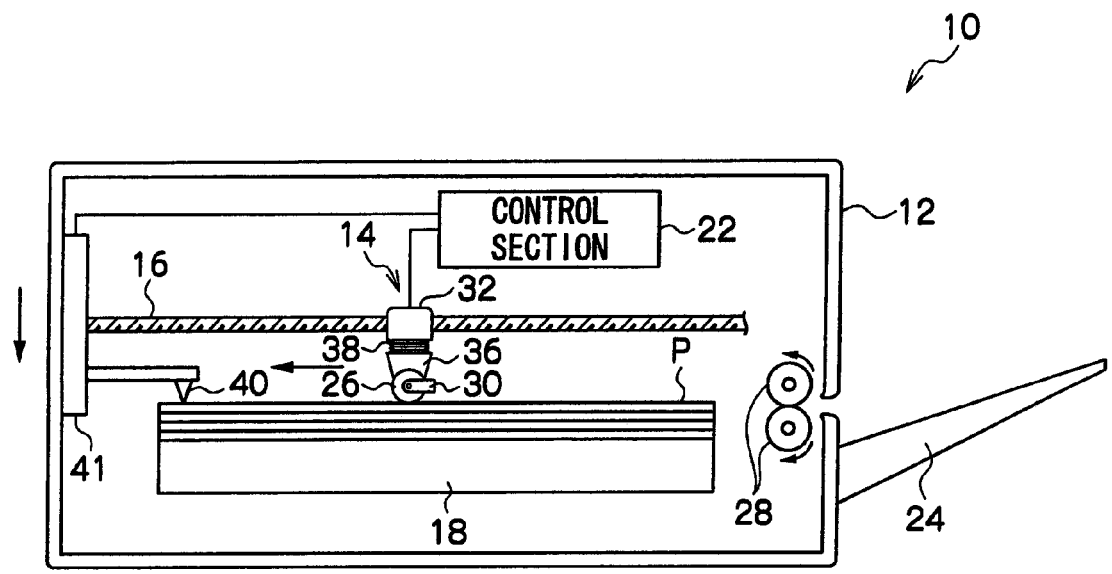
FIG. 1A is an operation description diagram of an optical writing device relating to a first exemplary embodiment of the present invention.

As shown in FIG. 1A, the control section 22 controls the voltage application member-raising/lowering mechanism 41 and thus causes the voltage application members 40 to connect with the terminal 60 and terminal 62 of the topmost image display medium P. Correspondingly, the control section 22 receives image data from an external data processing device and controls the driving section in accordance with the image data. Thus, in accordance with the image data, light is selectively irradiated at the topmost image display medium P from each of the plural LEDs 20A included in the LED array 20 that is provided at the LPH 14. In conjunction therewith, the control section 22, by controlling the conveyance section, causes the LPH 14 to move from the first position (see FIG. 3) to the second position (see FIG. 1B) at a constant speed. In this manner, an image is formed on the topmost image display medium P.

Figure 1B:
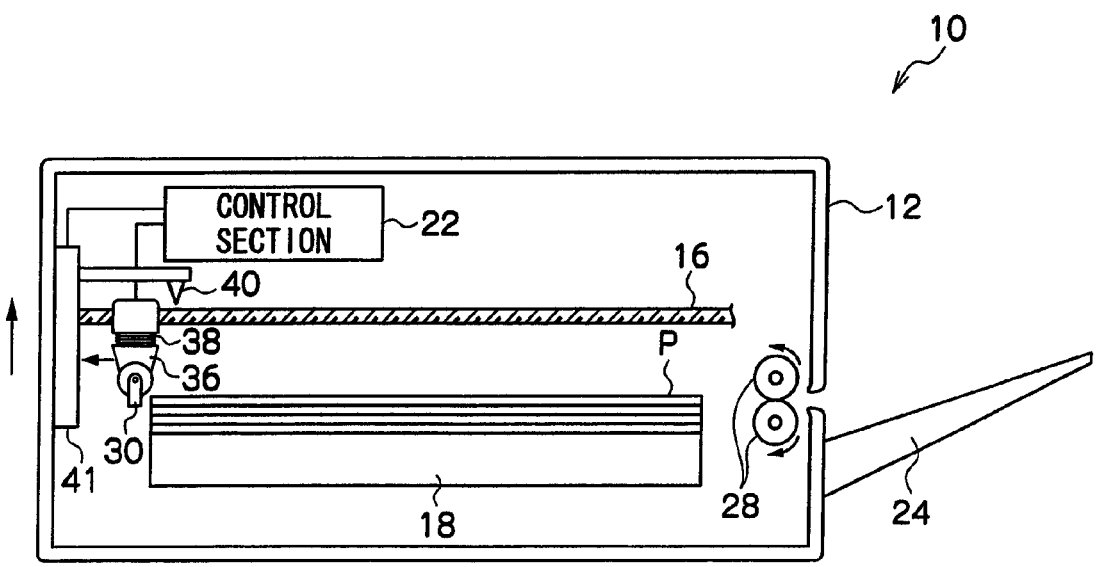
FIG. 1B is an operation description diagram of the optical writing device relating to the first exemplary embodiment of the present invention.

As shown in FIG. 1B, when the LPH 14 has passed along the image display medium P and reaches the second position, the control section 22 controls the voltage application member-raising/lowering mechanism, and thus disconnects the connection between the voltage application members 40 and the terminal 60 and terminal 62 of the topmost image display medium P. Correspondingly, the control section 22 turningly drives the protruding members 30 with driving force from a rotary driving member (not shown) such that distal end portions of the protruding members 30 are turned downward.

Figure 2A:
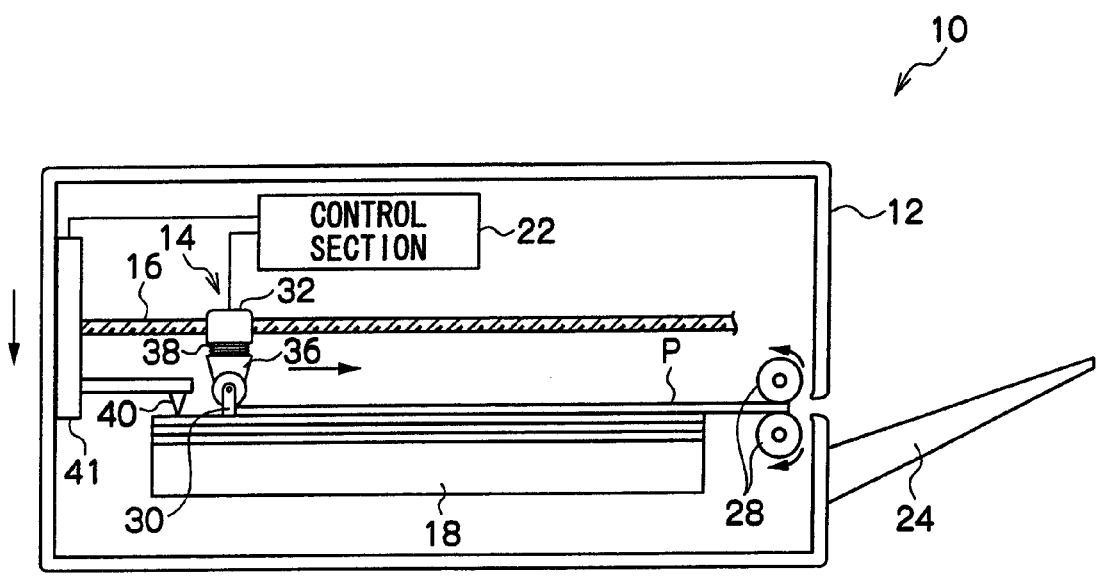
FIG. 2A is an operation description diagram of the optical writing device relating to the first exemplary embodiment of the present invention.
Figure 2B:
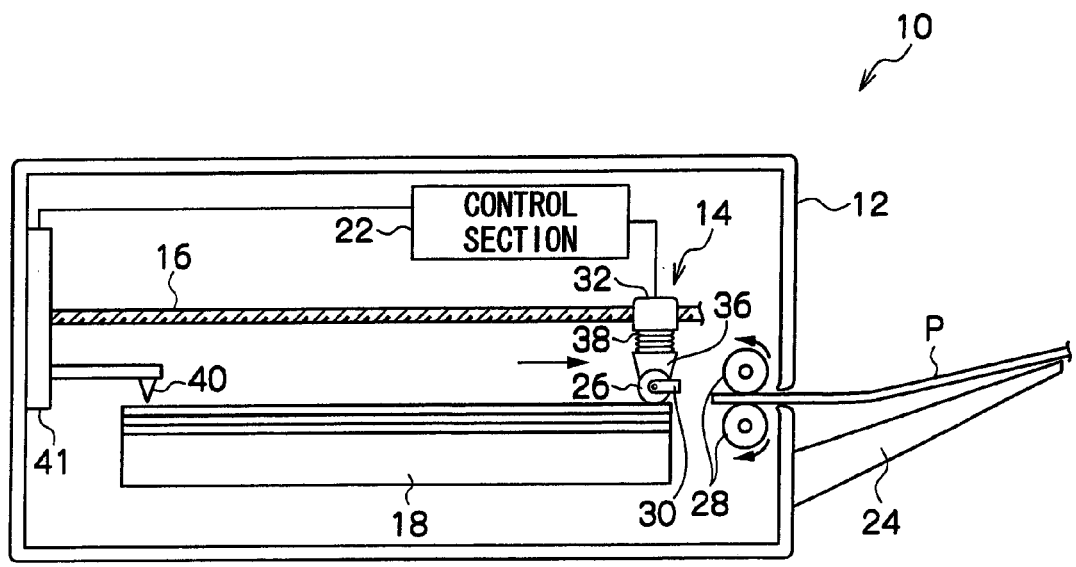
FIG. 2B is an operation description diagram of the optical writing device relating to the first exemplary embodiment of the present invention.

Then, as shown in FIG. 2A, the control section 22 maintains the state in which the distal ends of the protruding members 30 are turned downward and, by controlling the conveyance section, causes the LPH 14 to move from the second position to the first position at a constant speed. Correspondingly, the control section 22, by control of the voltage application member-raising/lowering mechanism, connects the voltage application members 40 with the terminal 60 and terminal 62 of an image display medium P that is stacked below the topmost image display medium P, which is exposed by the topmost image display medium P being conveyed. In conjunction therewith, the control section 22 controls the driving section, and thus irradiates uniform light of a predetermined intensity, for erasing an image on the image display medium P stacked below the topmost image display P, from each of the plural LEDs 20A included in the LED array 20.

More specifically, when the protruding members 30 abut against an end portion of the image display medium P stacked in the topmost position, the protruding members 30 convey the topmost image display medium P toward the ejection rollers 28. The image display medium P stacked below the topmost image display medium P, which is exposed by the topmost image display medium P being conveyed, is irradiated by the LPH 14 with the uniform light of the predetermined intensity for erasing an image, and the voltage application members 40 implement voltage application to the terminal 60 and the terminal 62. The topmost image display medium P, on which an image has been formed, is fed out along the conveyance path and ejected to the ejection tray 24 by the ejection rollers 28.

Then, when the LPH 14 reaches the first position, the control section 22 prepares for the next image formation operation, returning the protruding members 30 to the initial state along the image display medium P. At this time, in a case of continuing on to performing writing to the next image display medium, the voltage application members 40 are prepared for the next writing operation, staying connected with the terminal 60 and terminal 62 of the image display medium P.

That is, in the process of the LPH 14 moving from the first position to the second position and then returning from the second position to the first position, an image is formed on the image display medium P that is stacked in the topmost position, and any image on the image display medium P that is stacked below the image display medium P on which this image has been formed is erased.

Thus, the LPH 14 is also used for erasure of images. That is, irradiation of light bearing image information and irradiation of light for image erasure are carried out by the same light irradiation member. Therefore, in comparison with a structure which includes a member that carries out irradiation of light bearing image information and a member that carries out irradiation of light for image erasure, structure of the light irradiation member may be simplified.

Because ejection of a medium in which image has been formed and image erasure of a next medium are performed simultaneously in this manner, a duration in which an image is erased may be shortened in comparison with a structure that features a separate step for irradiating light that erases images. That is, a duration required for image recording can be shortened in comparison with a structure that features, after image recording using a light irradiation member, a separate step of irradiating light that erases an image.

Furthermore, the electrode terminals 60 and 62 to which the voltage application members 40 are connected are disposed to the side of an area that is an exposure region. Thus, electrical connection between the voltage application members and the light writing image display medium may be simplified in comparison with a case in which electrode terminals are provided at another region and this structure for implementing connection with the voltage application members is not included.

Anyway, a structure is possible in which, rather than the voltage application member-raising/lowering mechanism 41 being provided, in an initial state, the voltage application members 40 are connected with all the image display media P stacked on the accommodation section 18. Here, the terminal 60 of the electrode layer 48 and the terminal 62 of the electrode layer 50 of the image display medium P must be disposed at positions where are not located at the display side or the back side, and continuously exposed when stacked. According to such a structure, the step of connecting the voltage application members 40 with the terminals of the topmost image display medium P, the step of disconnecting the connection between the voltage application members 40 and the topmost image display medium P, and the step of connecting with the image display medium P that is stacked below the topmost image display medium P may be omitted. Further, according to the above-described structure in which only the image display medium P that is being irradiated with light is connected with the voltage application members 40, wiring that connects the image display medium P with the voltage application members 40 may be simplified.

—Concluding Description of Other Structures—

Next, an optical writing device 10' relating to a second exemplary embodiment, which is an example of the present invention, will be described in accordance with FIG. 7.

Here, members that are the same as in the first exemplary embodiment are assigned the same reference numerals and will not be described.

Figure 7:
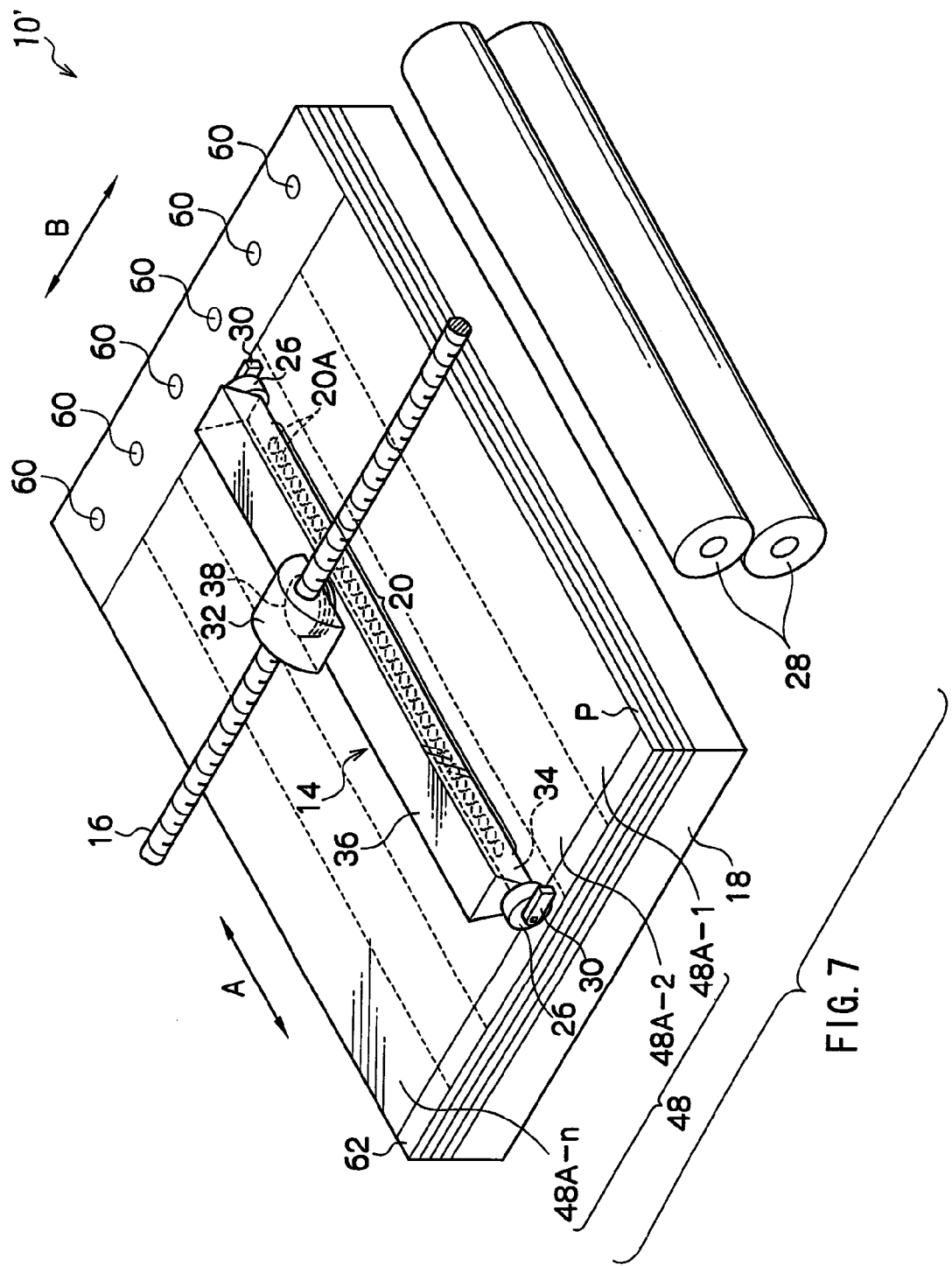
FIG. 7 is a perspective view of an optical writing device relating to a second exemplary embodiment of the present invention.

FIG. 7 is a perspective view of the optical writing device relating to the second exemplary embodiment of the present invention. As shown in FIG. 7, this exemplary embodiment differs from the first exemplary embodiment, with the terminals 60 of the electrode layer 48 being disposed in vicinities of edge portions that extend in the main direction of the image display medium P (the direction of arrow A). Further, in the present exemplary embodiment, the terminal 62 of the electrode layer 50, which extends in the sub direction (the direction of arrow B), is disposed at the opposite side from the terminals 60. As shown in FIG. 7, the electrode layer 48 is divided into a plurality of stripe-form sub electrode layers 48A which are formed along the length direction of the LPH 14, and the respective sub electrode layers 48A are electrically insulated from one another. In the following descriptions, in a case where it is necessary to distinguish individuals of the plural sub electrode layers 48A, they are referred to as a sub electrode layer 48A-1, a sub electrode layer 48A-2, . . . , and a sub electrode layer 48A-n (n being the total number of the sub electrode layers 48A). The respective sub electrode layers 48A are arranged as the sub electrode layer 48A-1, sub electrode layer 48A-2, . . . , sub electrode layer 48A-n in this order from an edge portion of the image display medium P, in rectangular areas which are demarcated by the broken lines in the image display medium P (see FIG. 7). Of course, the electrode layer 48 may be a continuous electrode rather than being divided. Meanwhile, the electrode layer 50, differently from the electrode layer 48, covers the whole area of the image display medium P and is not divided into a plurality of sub electrodes. Here, a structure in which the electrode layer 50 is divided into a plurality of sub electrodes in a similar manner to the electrode layer 48 is also possible. However, in such a case, opposing sub electrodes must be the same shape and the same size as one another. A structure is also possible in which the electrode layer 50 is divided into a plurality of sub electrodes and the electrode layer 48 covers the whole area of the image display medium P.

The sub electrode layers 48A and the electrode layer 50 conduct electricity from the voltage application members 40 via the terminals 60 and terminal 62 when the LPH 14 is irradiating light while being guided by the shaft 16 and moving in the sub direction. Because the terminals 60 and terminal 62 are provided in the vicinities of the edge portions that extend in the main direction of the image display medium P, it is possible to perform voltage application to a region that is being illuminated with light by the LPH 14.

Next, the optical writing device 70 will be described in accordance with FIG. 8 in relation to a third exemplary embodiment, which is an example of the present invention.

Here, members that are the same as in the first exemplary embodiment are assigned the same reference numerals and will not be described. Moreover, the LPH 14 is referred to as a first light irradiation member.

Figure 8:
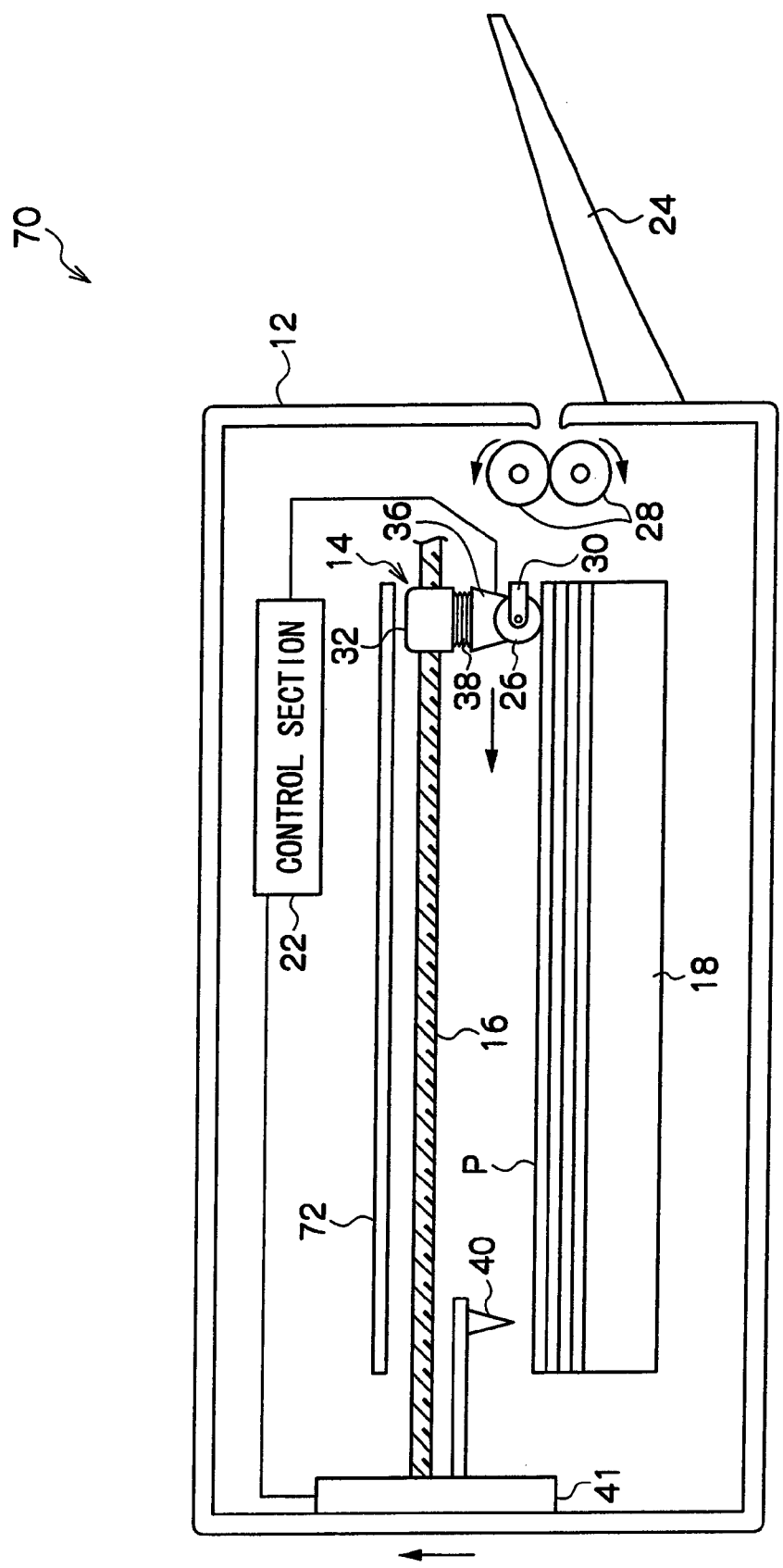
FIG. 8 is a schematic structural diagram of an optical writing device relating to a third exemplary embodiment of the present invention.

FIG. 8 is a schematic structural diagram of the optical writing device relating to the third exemplary embodiment of the present invention. As shown in FIG. 8, this exemplary embodiment differs from the first exemplary embodiment, with a plate-form surface light emission member 72, which surface-emits light from a position facing the stacked image display media P, being provided fixed to the casing 12. The surface light emission member 72 may be dividedly provided.

According to this structure, the surface light emission member 72 is formed so as to irradiate uniform light of a predetermined intensity for erasing an image on the image display medium P stacked below that is exposed by the topmost image display medium P being conveyed by the protruding members 30. If the surface light emission member 72 is dividedly provided, it is possible to irradiate light only at exposed portions. Because light irradiation for erasure is carried out by the surface light emission member 72, there is no need for light irradiation for erasure to be carried out by the LPH 14. Therefore, compared to a case in which light irradiation for erasure is carried out by the LPH 14, the LPH 14 may be conveyed to the first position at a higher speed, and a duration required for image recording may be shortened. That is, because irradiation of light bearing image information is carried out by the LPH 14 and irradiation of light for image erasure is carried out by the surface light emission member fixed to the casing, exposure control of the erasure step may be simplified.

Next, an optical writing device 80 relating to a fourth exemplary embodiment, which is an example of the present invention, will be described in accordance with FIG. 9.

Here, members that are the same as in the first exemplary embodiment are assigned the same reference numerals and will not be described. Moreover, the LPH 14 is referred to as a first light irradiation member.

Figure 9:
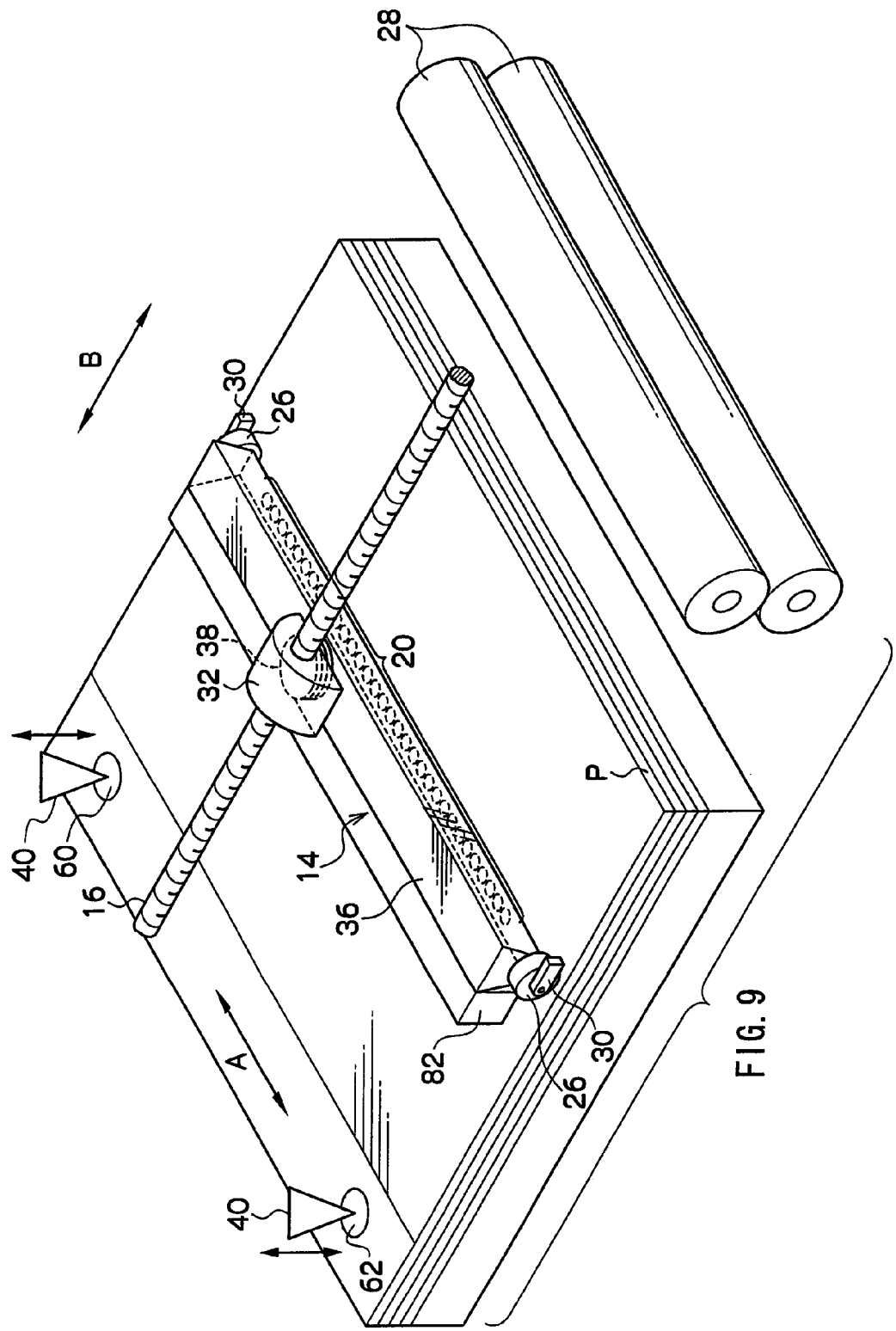
FIG. 9 is a perspective view of an optical writing device relating to a fourth exemplary embodiment of the present invention.

FIG. 9 is a perspective view of the optical writing device relating to the fourth exemplary embodiment of the present invention. As shown in FIG. 9, this exemplary embodiment differs from the first exemplary embodiment, with a light emission member 82, which extends in the length direction of the LPH 14, being fixed to the LPH 14. Herein, the light emission member 82 is referred to as a second light irradiation member.

More specifically, light generated from the light emission member 82 is directed at an image display medium P, and the light emission member 82 is formed so as to irradiate uniform light of a predetermined intensity for erasing an image at the image display medium P stacked below that is exposed by the topmost image display medium P being conveyed by the protruding members 30. According to the structure in which irradiation of light bearing image information is carried out by the LPH 14 and irradiation of light for image erasure is carried out by the light emission member 82, compared to a structure which is provided with a light irradiation member that carries out both irradiation of light bearing image information and irradiation of light for image erasure, degrees of freedom for designing a light source for erasure and a light source for image recording may be raised.

Next, an optical writing device 90 relating to a fifth exemplary embodiment, which is an example of the present invention, will be described in accordance with FIG. 10, FIG. 11A and FIG. 11B.

Here, members that are the same as in the first exemplary embodiment are assigned the same reference numerals and will not be described.

Figure 10:
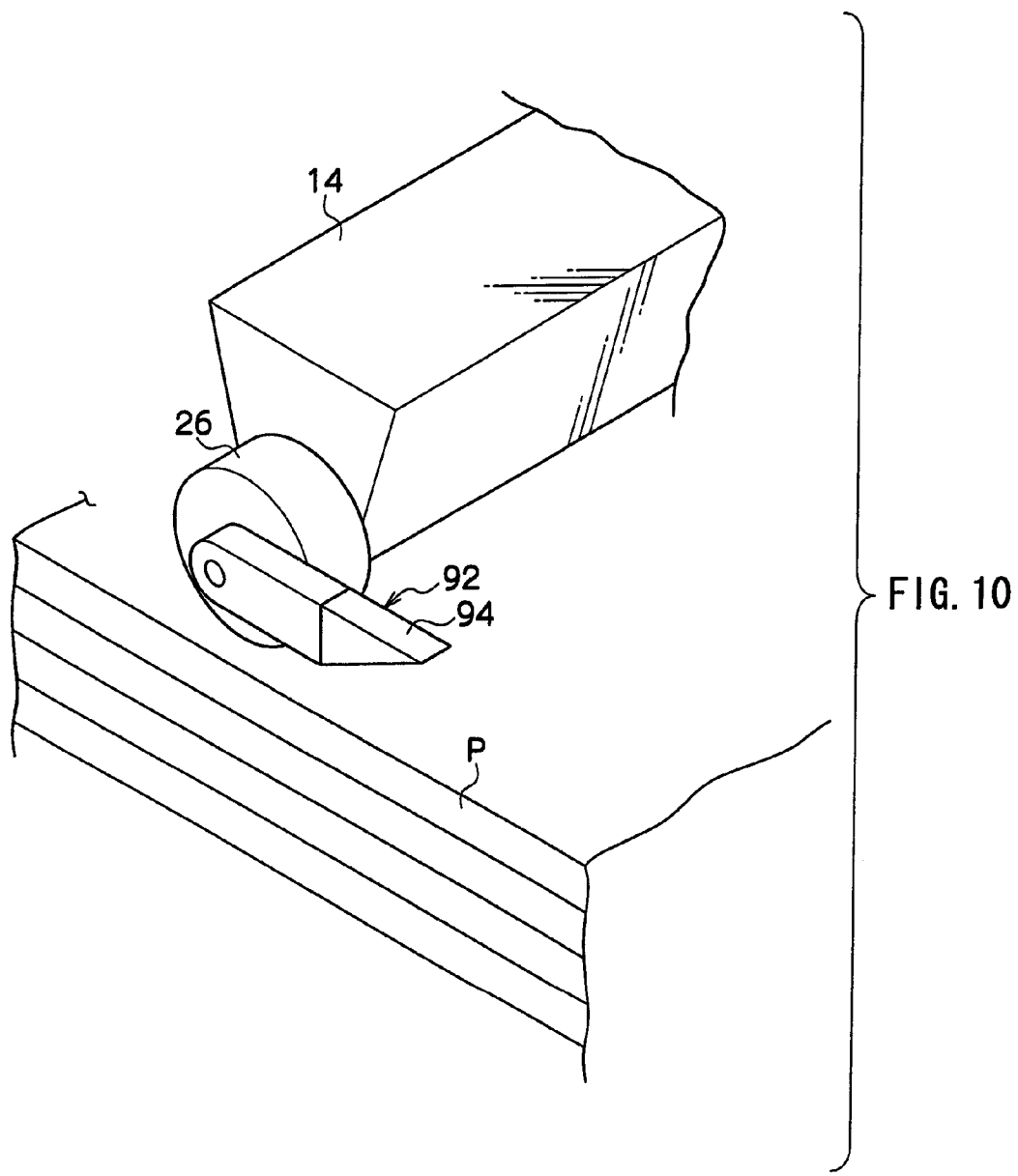
FIG. 10 is an enlarged perspective view showing a friction member and suchlike that are employed in an optical writing device relating to a fifth exemplary embodiment of the present invention.
Figure 11A:
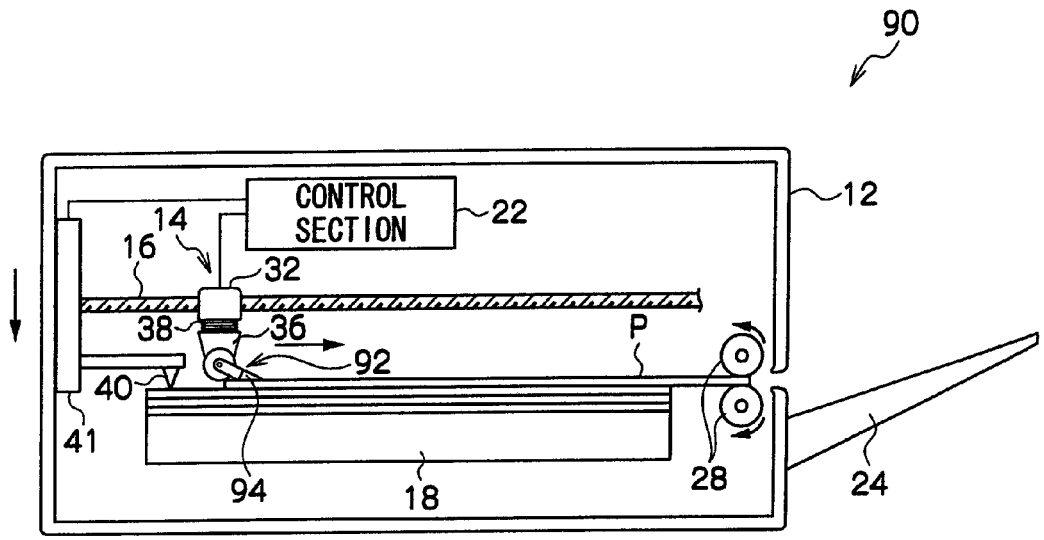
FIG. 11A is an operation description diagram of the optical writing device relating to the fifth exemplary embodiment of the present invention.
Figure 11B:
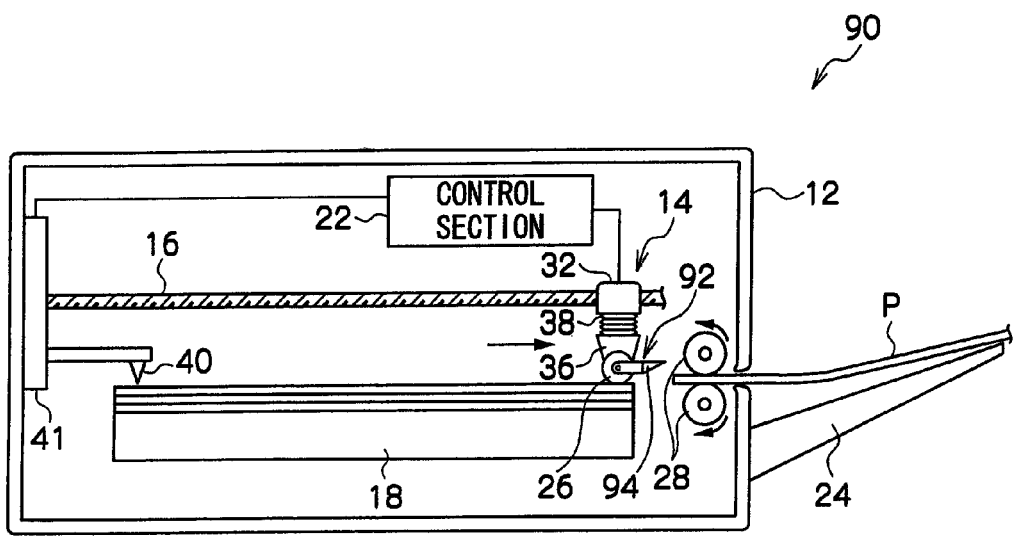
FIG. 11B is an operation description diagram of the optical writing device relating to the fifth exemplary embodiment of the present invention.

FIG. 10 is an enlarged perspective view showing a friction member and suchlike that are employed in the optical writing device relating to the fifth exemplary embodiment of the present invention, and FIG. 11A and FIG. 11B are operation description diagrams of the optical writing device relating to the fifth exemplary embodiment of the present invention. As shown in FIG. 10, this exemplary embodiment differs from the first exemplary embodiment, with friction members 92 being provided at the outer sides of the roller members 26 (the opposite sides thereof from the LPH 14) rather than the protruding members that abut against the end portions of the image display medium P being provided. The friction members 92 abut against a sheet face (face portions) of the topmost image display medium P and convey the image display medium P toward the ejection rollers 28 by frictional force. The friction members 92 are formed as rectangular shapes in cross-section and extend substantially parallel with the front face of the image display medium P. One end of each friction member 92 is fixed concentrically with the roller member 26, and a resistance portion 94 with a large frictional resistance is provided at a distal end portion.

More specifically, in the state in which the LPH 14 is disposed at the first position, which is the initial position, the friction members 92 are arranged substantially parallel with the front face of the image display medium P and the distal end portions of the resistance portions 94 are oriented towards the ejection rollers 28. In this structure, while the LPH 14 is moving from the first position toward the second position, by instruction from the control section 22, the friction members 92 are arranged substantially parallel with the front face of the image display medium P. Then, as shown in FIG. 11A and FIG. 11B, when the LPH 14 reaches the second position, under instruction from the control section 22, the friction members 92 are driven to turn, and the resistance portions 94 of the friction members 92 abut against the sheet face (face portions) of the image display medium P that is stacked in the topmost position.

Hence, while the LPH 14 is moving from the second position toward the first position under instruction from the control section 22, the image display medium P stacked in the topmost position is conveyed toward the ejection rollers 28 by frictional force between the image display medium P and the resistance portions 94. Because the friction members 92 are attached at the roller members 26, it is possible to utilize driving force of the LPH for conveying the image display medium P.

Therefore, in contrast to a case in which the friction members 92 are not included, conveyance of the image display medium P may be carried out utilizing driving force in accordance with movement of the light irradiation member.

Now, the present invention has been described in detail for specific exemplary embodiments, but the present invention is not to be limited by the present exemplary embodiments. It will be clear to practitioners that various other exemplary embodiments are possible within the scope of the present invention. For example, in the exemplary embodiment described above, the resistance portions 94 of the friction members 92 abut against the sheet face (face portions) and convey the image display medium P by frictional force. However, the image display medium P may be conveyed by provision of a suction member that suction-adheres the sheet face of the image display medium P and conveys the image display medium P with suction force. It is possible to utilize driving force of the LPH to perform conveyance of the image display medium P by forming the medium conveyance member as suction members attached at the roller members 26.

Next, an optical writing device 100 relating to a sixth exemplary embodiment, which is an example of the present invention, will be described in accordance with FIG. 12A and FIG. 12B.

Here, members that are the same as in the first exemplary embodiment are assigned the same reference numerals and will not be described.

Figure 12A:
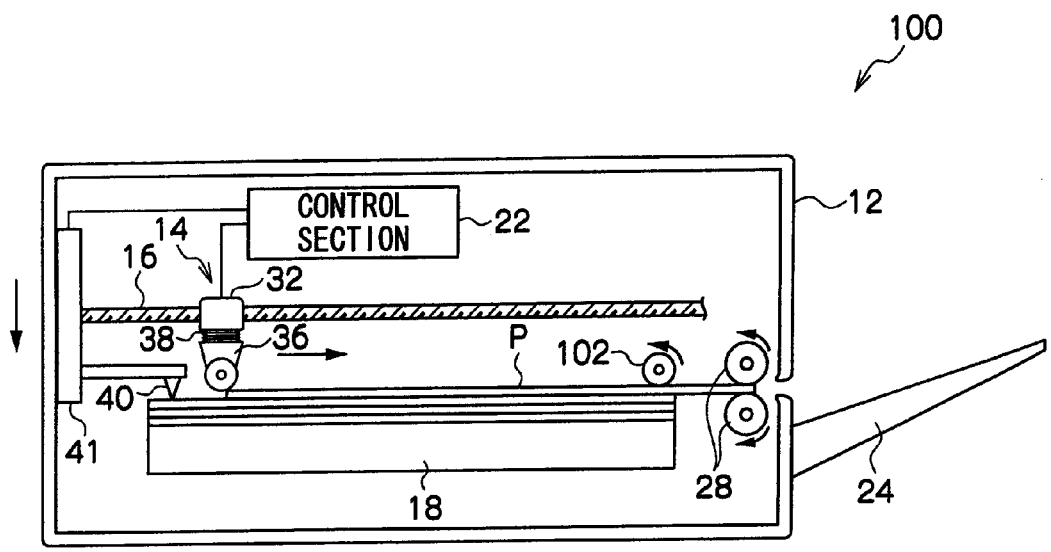
FIG. 12A is an operation description diagram of an optical writing device relating to a sixth exemplary embodiment of the present invention.
Figure 12B:
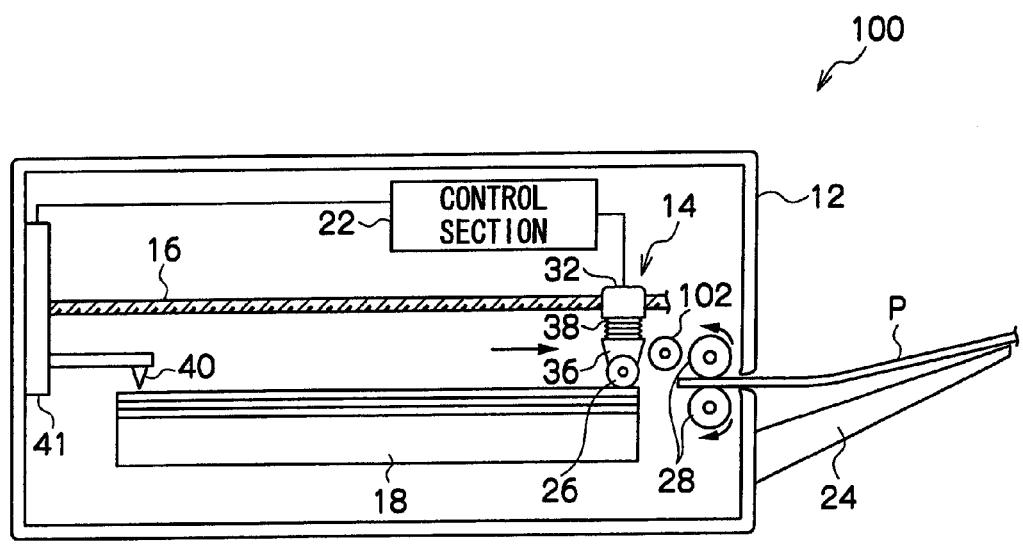
FIG. 12B is an operation description diagram of the optical writing device relating to the sixth exemplary embodiment of the present invention.

FIG. 12A and FIG. 12B are operation description diagrams of an optical writing device relating to the sixth exemplary embodiment of the present invention. As shown in FIG. 12A and FIG. 12B, this exemplary embodiment differs from the first exemplary embodiment, with a conveyance roller 102 for conveying the medium being attached to the casing 12 rather than the protruding members that abut against the end portion of the image display medium P being provided at the outer sides of the roller members 26 (the opposite sides thereof from the LPH 14). As shown in FIG. 12A, when medium conveyance commences, the conveyance roller 102 touches against the image display medium P that is disposed in the topmost position and turns in a direction for feeding out the medium. Then, after the image display medium P has moved to a position at which it is taken up by the ejection rollers 28, the conveyance roller 102 moves to a position not touching against the image display medium P, as shown in FIG. 12B. With this structure, a load on the head portion of the LPH when conveyance of a medium is being performed may be reduced, and endurance of the device may be improved.

Next, an operation for forming an image on an image display medium P using the optical writing device 100 of this sixth exemplary embodiment and an operation for erasing an image at the image display medium P will be described.

FIG. 12A and FIG. 12B are the operation description diagrams of the optical writing device relating to the sixth exemplary embodiment of the present invention. Firstly, the LPH 14 is disposed at the first position, which is the initial position, and the conveyance roller 102 is separated from the topmost image display medium P. The voltage application members 40 are also separated from the topmost image display medium.

The control section 22 controls the voltage application member-raising/lowering mechanism, and thus causes the voltage application members 40 to connect with the terminal 60 and terminal 62 of the topmost image display medium P. Correspondingly, the control section 22 receives image data from an external data processing device and controls the driving section in accordance with the image data. Thus, in accordance with the image data, light is selectively irradiated at the image display medium P stacked in the topmost position from each of the plural LEDs 20A included in the LED array 20 that is provided at the LPH 14. In conjunction therewith, the control section 22, by controlling the conveyance section, causes the LPH 14 to move at a constant speed from the first position to a position of a display portion of the topmost image display medium P at which a user wishes image writing to be performed. In this manner, an image is formed on the topmost image display medium P up to the position to which the LPH 14 is moved. Obviously, the LPH 14 may be moved as far as an end portion of the image display medium P. Hereinafter, a distance from the position of the initial state to the position at which the user wishes image writing to be performed is referred to as a first distance, and a distance from the position at which the user wishes image writing to be performed to the position of the initial state is referred to as a second distance.

After the LPH 14 has formed the image on the topmost image display medium P, the control section 22 controls the voltage application member-raising/lowering mechanism, and thus disconnects the connection between the voltage application members 40 and the terminal 60 and terminal 62 of the topmost image display medium P. Correspondingly, the conveyance roller 102 is caused to touch against the topmost image display medium P.

Then, as shown in FIG. 12A, the control section 22 maintains the contact between the conveyance roller 102 and the topmost image display medium P and, by causing the conveyance roller to turn so as to convey the image display medium P in the direction toward the ejection rollers 28, moves the topmost image display medium P at a constant speed. Further, the control section 22, by controlling the voltage application member-raising/lowering mechanism, connects the voltage application members 40 with the terminal 60 and terminal 62 of an image display medium P that is stacked below the topmost image display medium P, which is exposed by the topmost image display medium P being conveyed. After the image display medium P stacked below the topmost image display medium P has been exposed directly below the LPH 14 by the topmost image display medium P being conveyed, the control section 22 controls the driving section, and thus irradiates uniform light of a predetermined intensity for erasing an image at the image display medium P stacked below the topmost image display medium P, from each of the plural LEDs 20A included in the LED array 20. Then, after the image display medium P has moved to a position at which it is taken up by the ejection rollers 28, the conveyance roller 102 moves to the position not touching against the image display medium P, as shown in FIG. 12B.

More specifically, the image display medium P stacked in the topmost position is conveyed toward the ejection rollers 28 by the conveyance roller 102. The image display medium P stacked below the topmost image display medium P, which is exposed by the topmost image display medium P being conveyed, is irradiated by the LPH 14 with the uniform light of the predetermined intensity for erasing an image, and the voltage application members 40 implement voltage application to the terminal 60 and the terminal 62. The topmost image display medium P, on which an image has been formed, is conveyed along the conveyance path and ejected to the ejection tray 24 by the ejection rollers 28.

Then, when the LPH 14 reaches the first position, in a case of continuing on to performing writing to the next image display medium, the control section 22 prepares the voltage application members 40 for the next image formation operation, keeping them connected with the terminal 60 and terminal 62 of the image display medium P.

That is, in the process of the LPH 14 moving from the first position to the second position and then returning from the second position to the first position, an image is formed at the image display medium P that is stacked in the topmost position, and any image on the image display medium P that is stacked below the image display medium P on which this image has been formed is erased.

Because ejection of a medium in which image has been formed and image erasure of a next medium are performed simultaneously in this manner, a duration in which an image is erased may be shortened in comparison with a structure that features a separate process for irradiating light that erases images.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the chart. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An optical writing device that performs optical writing on an exposure region of a light writing display medium in which a light-conductive layer is laminated at a display layer, the optical writing device comprising:
    an accommodation section at which a plurality of the media are stacked;
    a light irradiation member that performs light irradiation at a medium, of the plurality of media, of which the exposure region is exposed, the light irradiation member moving in a first direction while irradiating light bearing image information, and irradiating light for image erasure while moving in a second direction, which is opposite to the first direction;
    a voltage application member that connects with, of the plurality of media, the medium that is irradiated with light by the light irradiation member, and applies a voltage required for times of optical writing to the medium that is irradiated with light by the light irradiation member;
    a medium conveyance member that, simultaneously with the movement of the light irradiation member in the second direction, conveys, of the plurality of media, the medium for which the irradiation with light bearing image information has been performed, in the second direction; and
    a control section that performs control for
        the voltage application member applying voltage to a first medium, which is stacked at an outermost side of the plurality of media,
        the light irradiation member irradiating the light bearing image information and moving a first distance in the first direction over the first medium,
        the voltage application member applying voltage to a second medium, which is stacked at an inner side relative to the first medium, the second medium being exposed by the first medium being conveyed,
        the light irradiation member irradiating the light for image erasure at the second medium and moving a second distance in the second direction over the second medium, and,
        simultaneously with the movement of the light irradiation member in the second direction, the medium conveyance member conveying the first medium.

2. The optical writing device of claim 1, wherein the light irradiation member implements the irradiation of light bearing image information and the irradiation of light for image erasure with a common light irradiation member.

3. The optical writing device of claim 1, wherein the light irradiation member comprises a first light irradiation member, which moves in the first direction while irradiating the light bearing image information, and a surface light-emission member, which is fixed to a casing of the writing device and irradiates the light for image erasure.

4. The optical writing device of claim 1, wherein the light irradiation member comprises a first light irradiation member, which moves in the first direction while irradiating the light bearing image information, and a second light irradiation member, which is a separate light source from the first light irradiation member and, when moving in the second direction, irradiates the light for image erasure while moving.

5. The optical writing device of claim 1, wherein the light writing display medium includes an electrode terminal, to which the voltage application member connects, disposed at a side of the medium of a face that includes the exposure region, and
the control section performs control for
the voltage application member applying voltage to the electrode terminal of the first medium,
the light irradiation member irradiating the light bearing image information and moving the first distance in the first direction over the first medium,
disconnecting the connection between the voltage application member and the electrode terminal of the first medium,
the voltage application member applying voltage to the second medium by connecting to the electrode terminal of the second medium, which is exposed by the first medium being conveyed,
the light irradiation member irradiating the light for image erasure at the second medium and moving the second distance in the second direction over the second medium, and
simultaneously with the movement of the light irradiation member in the second direction, the medium conveyance member conveying the first medium.

6. The optical writing device of claim 1, wherein the medium conveyance member comprises a contact member that is provided at the light irradiation member and that, by abutting against an end portion of the first medium when the light irradiation member is at the end portion, conveys the first medium while pushing the first medium in the second direction in accordance with movement of the light irradiation member.

7. The optical writing device of claim 1, wherein the optical writing device further comprises a movement member that moves the light irradiation member in the first and second directions, the movement member including
a cylindrical shaft that guides movement of the light irradiation member,
a passage member through which the shaft passes and that is joined to the light irradiation member, and
a pushing member, between the light irradiation member and the passage member, that pushes the light irradiation member toward the medium.

8. The optical writing device of claim 1, wherein the light irradiation member comprises a main body and an LED array that includes
a plurality of LEDs arrayed in a line along a length direction in the main body and
lenses that focus light irradiated from the LEDs while transmitting the light toward the medium.

9. The optical writing device of claim 1, further comprising a voltage application member-raising/lowering mechanism that is connected with the voltage application member and drives the voltage application member up and down.

10. The optical writing device of claim 1, further comprising roller members that roll on the medium at each end portion of the light irradiation member to length direction and maintain a separation between the light irradiation member and the medium,
wherein the medium conveyance member includes a protruding member that extends along a surface of the medium and of which a cross-section that faces in an external direction is rectangular.

11. The optical writing device of claim 1, wherein the medium has an electrode layer, the electrode layer is divided into a plurality of sub electrode layers in the form of stripes along a length direction of the light irradiation member, and the sub electrode layers are respectively electrically insulated from one another.

12. The optical writing device of claim 1, wherein the medium conveyance member comprises a conveyance roller that is attached to a casing of the writing device and conveys the medium.

13. An optical writing method that performs optical writing, with light of a light irradiation member, on an exposure region of a light writing display medium in which a light-conductive layer is laminated at a display layer, the optical writing method comprising:
applying voltage to a first medium, which is stacked at an outermost side of a plurality of media;
irradiating light bearing image information at the first medium and moving the light irradiation member a first distance in a first direction;
applying voltage to a second medium, which is stacked at an inner side relative to the first medium, the second medium being exposed by the first medium being conveyed;
irradiating light for image erasure at the second medium and moving the light irradiation member a second distance in a second direction, which is opposite to the first direction; and
simultaneously with the movement in the second direction, conveying the first medium.

* * * * *